No. 862,163. PATENTED AUG. 6, 1907.
F. J. HORRIGAN.
ROOT CUTTER.
APPLICATION FILED OCT. 1, 1906.

WITNESSES:

INVENTOR
Francis J. Horrigan
By E. Laas
ATTORNEY.

UNITED STATES PATENT OFFICE.

FRANCIS J. HORRIGAN, OF SYRACUSE, NEW YORK.

ROOT-CUTTER.

No. 862,163.  Specification of Letters Patent.  Patented Aug. 6, 1907.

Application filed October 1, 1906. Serial No. 336,839.

*To all whom it may concern:*

Be it known that I, FRANCIS J. HORRIGAN, a citizen of the United States, and a resident of Syracuse, in the county of Onondaga, in the State of New York, have invented new and useful Improvements in Root-Cutters, of which the following, taken in connection with the accompanying drawings, is a full, clear, and exact description.

This invention relates to the class of machines which are designed to cut roots or analogous vegetables into small particles.

The invention resides especially in the attachment of the cutters to the rotary cylinder.

The object of the invention is to render the said attachment simple in construction, secure and efficient in its operation and adjustable to permit the cutter to be reversed on its seat so as to present a new cutting edge to the vegetable to be operated on in case the previously used cutting edge is injured or worn out. And to that end the invention consists in the improved construction and combination of the component parts of the attachment of the cutter as hereinafter described and claimed.

Figure 1:
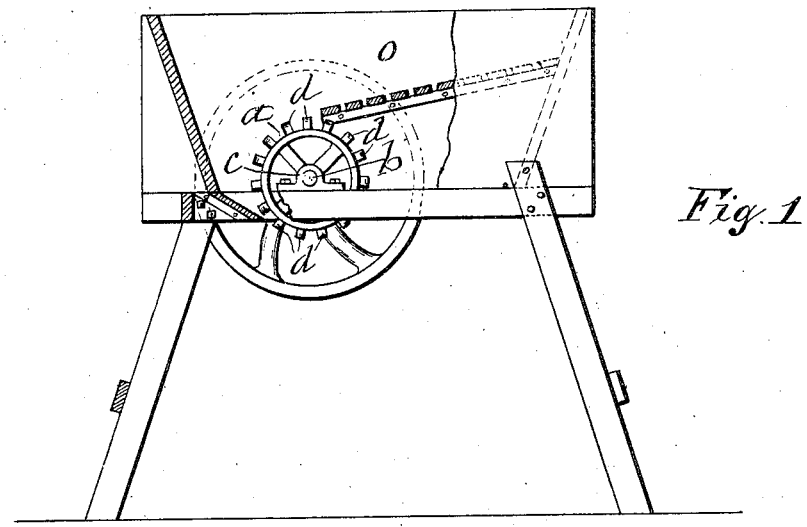
Figure 2:
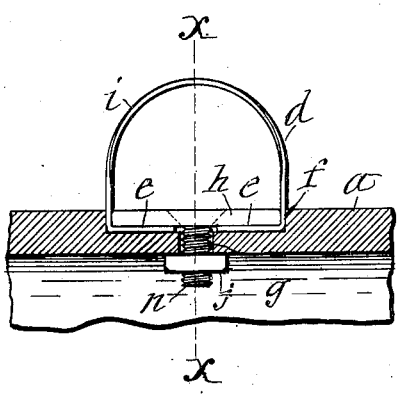

In the accompanying drawings, Figure 1 is a fragmentary side view of a root-cutting machine which has its cutters attached to the rotary cylinder in accordance with my invention: Fig. 2 is an enlarged longitudinal sectional view of a portion of the cylinder illustrating the attachment of the cutter: and Fig. 3 is a transverse section on the line —x—x— in Fig. 2.

—a— represents the rotary cutting-cylinder which is hollow and has its shaft —b— journaled in bearings —c— secured to the interior of the hopper —o—. The end of the shaft —b— is usually provided with a suitable crank by which to rotate the cylinder.

—d—d— denote the cutters which are rigidly mounted on the periphery of the cylinder —a— and usually arranged in spiral or staggering lines around the cylinder. The said arrangement of the cutters is immaterial to my invention and therefore not illustrated in the accompanying drawings. The cutters —d—d— are each formed from a band or elongated plate of spring steel bowed semicircular at the central portion of its length to project sufficiently from the cylinder to allow the cutter to operate on the roots introduced in the hopper "o" of the machine and reduce said roots to fine particles suitable for the purpose for which they are to be used.

Figure 3:
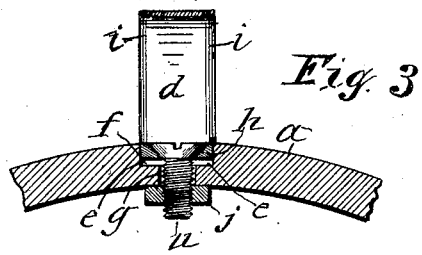

I preferably sharpen both edges of the cutter as shown at —i—i— in Figs. 2 and 3 of the drawings to allow either of said edges to be used for cutting the roots. The end portions —e—e— of the aforesaid cutter-plate are bent at right angles partway inward or toward each other to provide the cutter with a strong and narrow base which obviates outward projections of the base of the cutter at opposite sides thereof, which projections tend to gather scrapings of roots on the surface of the cylinder. In order to further guard against such effects and at the same time retain the cutters in proper operative positions on the cylinder I form the periphery of the cylinder —a— with rectangular recesses or sockets —f— arranged staggering or in spiral lines around the cylinder and of proper size and depth to allow the bases of the cutters to be properly seated therein. The center of each socket —f— is perforated as shown at —g— and onto the end portions —e—e— of the cutter is placed a washer —h— which is perforated at its center coinciding with the perforation of the socket. Said washer abuts with its side edges against the side portions of the cutter as shown in Fig. 2 to thoroughly tighten the base of the cutter on the sides of the recess —f—. The entire exterior of the washer is flush with the periphery of the cylinder —a— when the cutter is properly seated in socket —f—. Through the perforations of the washer and periphery of the cylinder passes a bolt —n— which is provided on its inner end with a nut —j— engaging the inner periphery of the cylinder —a— and firmly clamping the cutter in the socket —f—. The head of the bolt —n— is countersunk in the washer —h—, as shown in Figs. 2 and 3, to prevent said head from catching and gathering the substance operated on by the cutter. The cutter is sharpened at its front and rear edges and is reversible in its seat on the cylinder to allow the rear edge thereof to be presented at the front of the cutter when the latter is broken or injured. The reversing of the cutter is readily accomplished by loosening the nut —j— sufficiently to allow the base of the cutter to be raised out of the socket —f— and to be turned around and reseated in the socket and fastened therein by tightening the nut —j—.

What I claim is:—

In combination with the cylinder formed with recesses in its peripheral face, a series of cutters, each of which consists of a plate bowed semicircular at the central portion of its length and having its end portions deflected at right angles partway toward each other and seated in one of the aforesaid recesses, a washer placed on said end portions and having its entire exterior flush with the surface of the cylinder, and the attaching bolt having its head countersunk in the washer substantially as set forth and shown.

FRANCIS J. HORRIGAN.

Witnesses:
J. J. LAASS,
E. LAASS.